C. P. HAUGHIAN.
COMPOSITE METALLIC GIRDERS.
No. 183,160. Patented Oct. 10, 1876.
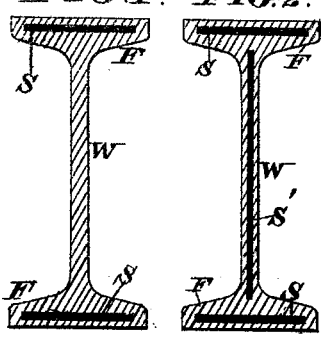
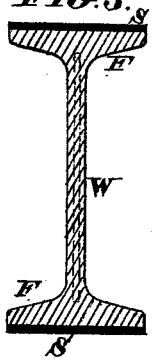
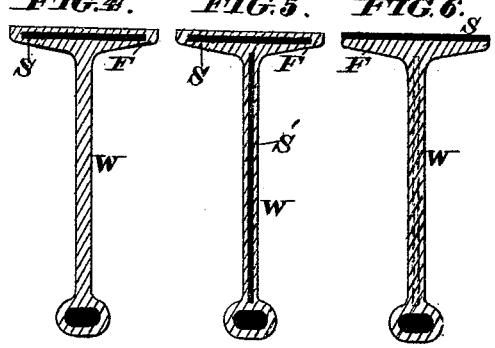
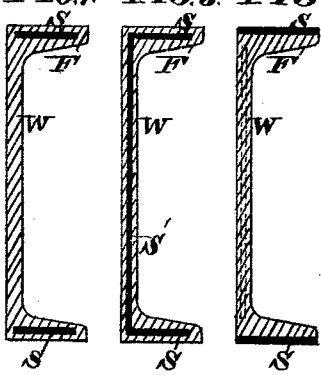
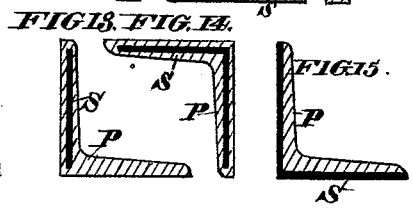
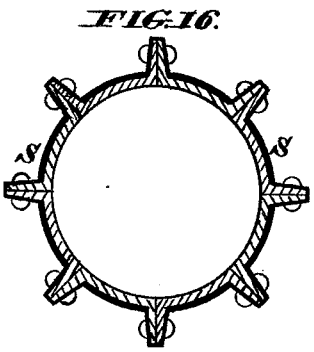
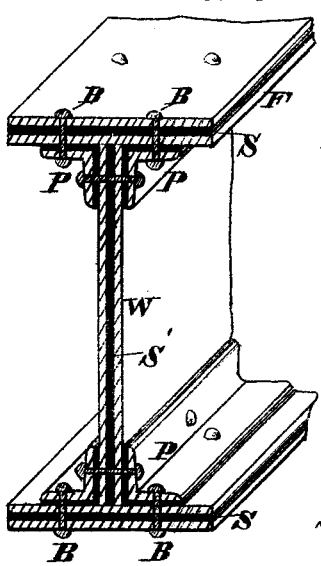
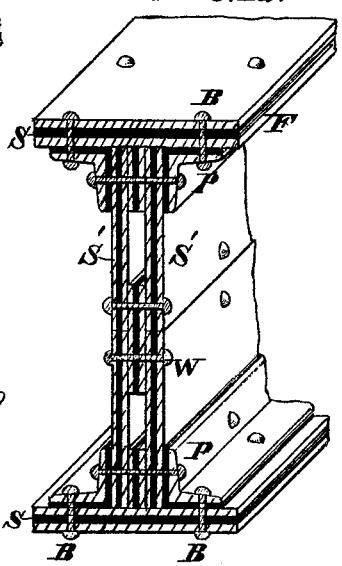
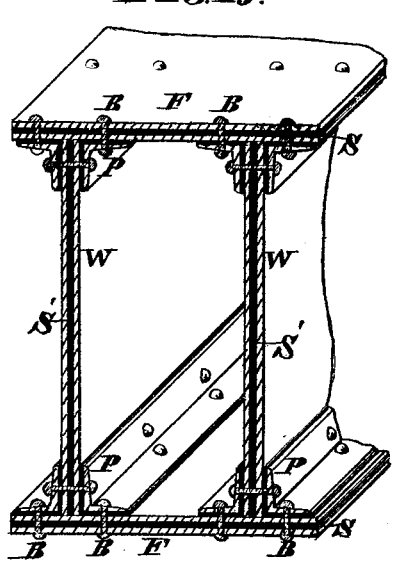
WITNESSES
Chas. J. Gooch
W. H. Pearce
INVENTOR
Charles P. Haughian
By Knight Bros. Attorneys
JAMES R. OSGOOD & CO. BOSTON.

UNITED STATES PATENT OFFICE.

CHARLES P. HAUGHIAN, OF BROOKLYN, NEW YORK, ASSIGNOR TO WILLIAM ARTHUR, IN TRUST FOR WILLIAM ARTHUR, CHARLES P. HAUGHIAN, CASPER D. SCHUBARTH, AND JULIUS BAUR, OF SAME PLACE, AND ALFRED B. MULLETT, OF WASHINGTON, DISTRICT OF COLUMBIA.

IMPROVEMENT IN COMPOSITE METALLIC GIRDERS.

Specification forming part of Letters Patent No. 183,160, dated October 10, 1876; application filed December 18, 1875.

*To all whom it may concern:*

Be it known that I, CHARLES P. HAUGHIAN, of Brooklyn, in the county of Kings and State of New York, have invented a new and useful Improvement in the Manufacture of Compound Beams, Plates, and Girders for architectural, engineering, and ship-building purposes; and I hereby declare that the following is a correct description of the said invention.

My invention consists in combining, in structures of the description specified, steel and wrought-iron inseparably welded together, so as to unite the capacity of steel for resisting great tension, compression, and other valuable properties, with the toughness and other desirable qualities of wrought-iron.

In carrying out my invention I take any necessary number of plates of wrought-iron and steel, and place them alternately one on the other until a pile has been formed which, when shaped under the rolls, will give a layer of steel on or through the beam, plate, or other structure at any place desired. The pile being prepared as above stated, and the plates properly secured together when necessary, the mass is placed in the furnace and heated to a welding-heat, when it is removed and passed through rolls adapted to reduce it to the desired dimensions and shape. The iron and steel are thus inseparably welded together, and a structure is produced possessing tensile strength, stiffness, and the capacity to resist crushing forces in such a high degree that a much lighter beam or other structure can be used and longer spans covered than would be practicable with iron beams or girders.

The invention is applicable to the production of beams and girders of all the various forms used in architecture, engineering, and ship-building, and to the production of channel, angle, T, and other plates or bars of the forms commonly employed to make up compounded girders, columns, truss-frames, and other structures for resisting heavy strains.

The accompanying drawings illustrate a number of modes of embodying the invention.

Figure 1 represents a section of an I-beam, with a plate of steel, S, welded within each of the flanges F of the beam, the web W and the external parts of the flanges being of wrought-iron.

Fig. 2 is a section of a similar beam, with an additional plate of steel, S', welded within the web W.

Fig. 3 is a section showing plates of steel S welded to the external surfaces of the flanges F, and illustrating also, by dotted lines, the combination therewith of a central plate of steel within the web W, as in Fig. 2.

Figs. 4, 5, and 6 are sections illustrating T-beams under modifications similar to those described with reference to Figs. 1, 2, and 3.

Figs. 7, 8, and 9 illustrate corresponding modifications in the construction of channel-plates.

Figs. 10, 11, and 12 are sections of T-bars under similar modifications.

Figs. 13, 14, and 15 are sections of angle-plates, Fig. 13 showing a steel plate, S, welded within one of the flanges, Fig. 14 a similar plate within each flange, and Fig. 15 external steel plates welded to each other and to the iron.

In all the views, S or S' represent re-enforce plates of steel, the other portions of the structure being of wrought-iron, to which the steel is inseparably welded, and the dotted lines illustrate the optional use of additional plates or cores of steel.

Fig. 16 is a transverse section of a column constructed of compound wrought-iron and steel channel-plates, the steel re-enforce S being placed, as shown, within the chamber, so as to be on the outside of the column, or, if preferred, being placed at the backs of the channel-plates and within the hollow column.

Fig. 17 is a perspective view of a portion of an I-girder, the flanges F and web W of which are each made up of two plates of iron, with a re-enforce plate, S, of steel inseparably welded between them, the whole being connected by means of angle-plates P, constructed as shown in Fig. 15, and bolts B.

Fig. 18 is a perspective view of a portion of an H, with similar parts indicated by corresponding letters of reference.

Fig. 19 is a perspective view of a portion of a box-girder embodying the invention in like manner.

These illustrations will serve to suggest to the skilled workman and manufacturer many other forms under which the invention may be embodied, the details of construction being variable to suit the exigencies of each particular case.

The invention is applicable to the formation of all parts of truss-frames, beams, girders, and other structures, whether rolled complete or formed of plates, angles, T's, or channels of compound welded steel and iron.

In carrying out my invention I prefer to use chrome-steel, having found by experience that it possesses superior power of welding.

What I claim as new, and desire to secure by Letters Patent, is—

A compound beam, girder, flanged plate, or analogous structure, for architectural, engineering, or ship-building purposes, consisting of iron and steel inseparably welded together, in manner substantially as herein described.

C. P. HAUGHIAN.

Witnesses:
A. B. MULLETT,
C. D. SCHUBARTH.